United States Patent
Vyas et al.

(10) Patent No.: US 10,649,886 B2
(45) Date of Patent: *May 12, 2020

(54) AUTOMATICALLY VALIDATED RELEASE CANDIDATES FOR DATA-DRIVEN APPLICATIONS BY AUTOMATED PUBLISHING OF INTEGRATION MICROSERVICE AND DATA CONTAINER TUPLE

(71) Applicant: Red Hat, Inc., Raleigh, NC (US)

(72) Inventors: Jay Vyas, Concord, MA (US); Huamin Chen, Westborough, MA (US)

(73) Assignee: Red Hat, Inc., Raleigh, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 16/146,392

(22) Filed: Sep. 28, 2018

(65) Prior Publication Data

US 2019/0034322 A1   Jan. 31, 2019

Related U.S. Application Data

(63) Continuation of application No. 15/297,916, filed on Oct. 19, 2016, now Pat. No. 10,108,534.

(51) Int. Cl.
| | |
|---|---|
| *G06F 11/00* | (2006.01) |
| *G06F 11/36* | (2006.01) |
| *G06F 8/65* | (2018.01) |
| *G06F 8/71* | (2018.01) |
| *G06F 9/455* | (2018.01) |
| *G06F 11/14* | (2006.01) |

(52) U.S. Cl.
CPC ........... *G06F 11/3668* (2013.01); *G06F 8/65* (2013.01); *G06F 8/71* (2013.01); *G06F 9/455* (2013.01); *G06F 11/14* (2013.01)

(58) Field of Classification Search
CPC ............ G06F 11/0706; G06F 11/0718; G06F 11/3612; G06F 11/3636; G06F 11/366; G06F 11/3668; G06F 11/3672; G06F 11/3688
USPC ......................................................... 714/38.1
See application file for complete search history.

(56) References Cited

U.S. PATENT DOCUMENTS 7,353,259 B1 * 4/2008 Bakke ................. G06F 9/44505
709/208
8,621,062 B1 * 12/2013 Anderson ............... G06F 11/30
709/223

(Continued)

FOREIGN PATENT DOCUMENTS

| CN | 105550130 A | 5/2016 |
|---|---|---|
| WO | 2016/099346 A1 | 6/2016 |

*Primary Examiner* — Sarai E Butler
(74) *Attorney, Agent, or Firm* — K&L Gates LLP

(57) ABSTRACT

A system and method for automatically validated release candidates for data-driven applications includes monitoring a first microservice and a second microservice. A respective functionality of each microservice is independently verifiable. The method also includes determining whether at least one of the first microservice and the second microservice is updated. The first microservice includes a first liveness probe and the second microservice includes a second liveness probe. The method further includes, responsive to determining that the first microservice is updated, updating the first liveness probe using a first data schema. The first data schema is associated with the first microservice.

20 Claims, 7 Drawing Sheets

(56) References Cited

U.S. PATENT DOCUMENTS

| | | | |
|---|---|---|---|
| 8,677,315 B1 | 3/2014 | Anderson et al. | |
| 9,262,127 B2 | 2/2016 | Patrick | |
| 10,397,085 B1* | 8/2019 | Seth | H04L 43/10 |
| 2008/0005624 A1* | 1/2008 | Kakivaya | H04L 67/104 |
| | | | 714/47.1 |
| 2008/0034110 A1* | 2/2008 | Suganthi | H04L 63/0272 |
| | | | 709/238 |
| 2009/0199173 A1* | 8/2009 | Ramannavar | G06F 8/70 |
| | | | 717/168 |
| 2013/0205162 A1* | 8/2013 | Hirose | G06F 11/2023 |
| | | | 714/4.11 |
| 2014/0198091 A1* | 7/2014 | Shin | G09G 3/3233 |
| | | | 345/212 |
| 2016/0124742 A1 | 5/2016 | Rangasamy et al. | |
| 2016/0350165 A1* | 12/2016 | LeMond | G06F 11/079 |

\* cited by examiner

US 10,649,886 B2

AUTOMATICALLY VALIDATED RELEASE CANDIDATES FOR DATA-DRIVEN APPLICATIONS BY AUTOMATED PUBLISHING OF INTEGRATION MICROSERVICE AND DATA CONTAINER TUPLE

CROSS REFERENCES TO RELATED APPLICATIONS

The present application is a continuation of application Ser. No. 15/297,916 filed on Oct. 19, 2016, the entire content of which is hereby incorporated by reference herein.

BACKGROUND

A container may be a virtualized object similar to a virtual machine except that, typically, a container may not implement a guest operating system and may, for example, instead utilize a host operating system of a physical machine. One or more applications and/or utilities may execute in a container. A container may have one or more respective, filesystems, memory, devices, network ports, etc. for accessing the physical resources of the physical machine and other resources outside of the physical machine. Specific requests to access physical resources inside or outside of the physical machine may be made through the host operating system.

In computer systems, containers are typically used for creating hosting environments for running application programs. Computer systems may use containers to separate various components of a computing system. For example, different components of a computing system may be executed at different containers. Kubernetes®, which is an open-source system, may be used for automating deployment, scaling, and management of containerized applications.

A microservice may refer to an application with a single function or service, such as making an online payment or routing network traffic. Microservices may be used to develop an application having independently deployable services. In a typical example, a microservice is run in a container. Running microservices in containers may be helpful for developing and deploying large applications, such as enterprise solutions.

SUMMARY

The present disclosure provides new and innovative methods and systems for automatically validated release candidates for data-driven applications by automated publishing of integration microservice and data container tuple. An example method includes monitoring a first microservice and a second microservice. A respective functionality of each microservice is independently verifiable. The method also includes determining whether at least one of the first microservice and the second microservice is updated. The first microservice includes a first liveness probe and the second microservice includes a second liveness probe. The method further includes, responsive to determining that the first microservice is updated, updating the first liveness probe using a first data schema, which is associated with the first microservice.

An example system includes a memory and one or more processors in communication with the memory. The one or more processors are configured, when executed, to monitor a first microservice and a second microservice. A respective functionality of each microservice is independently verifiable. The one or more processors are also configured, when executed, to determine whether at least one of the first microservice and the second microservice is updated. The first microservice includes a first liveness probe and the second microservice includes a second liveness probe. The one or more processors are further configured, when executed, to update the first liveness probe using a first data schema responsive to determining that the first microservice is updated, which is associated with the first microservice.

Additional features and advantages of the disclosed methods and system are described in, and will be apparent from, the following Detailed Description and the Figures.

DETAILED DESCRIPTION OF EXAMPLE EMBODIMENTS

Figure 1:
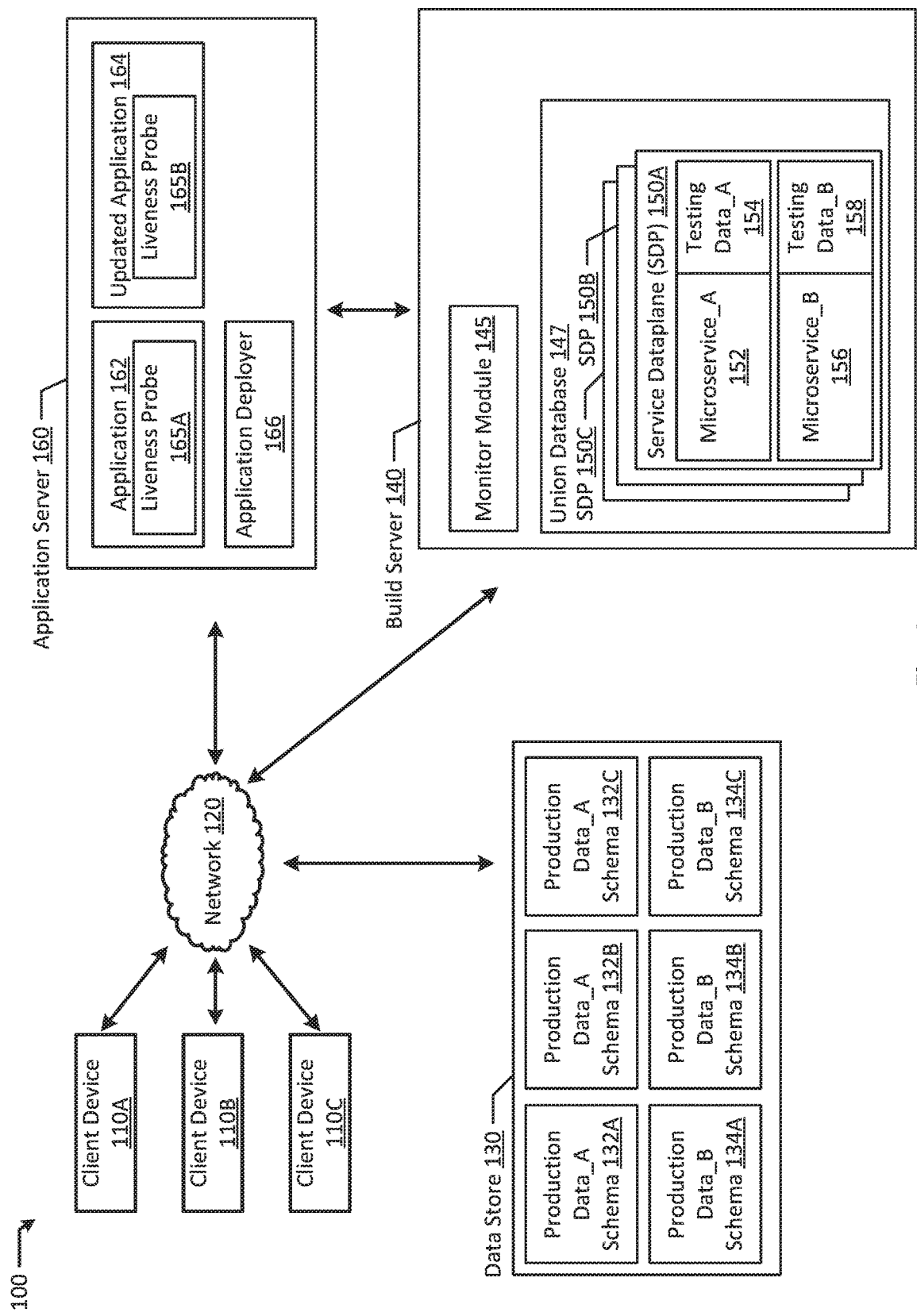
FIG. 1 is a block diagram of an example system according to an example of the present disclosure.

Described herein are methods and systems for automatically validated release candidates for data-driven applications by automated publishing of integration microservice and data container tuple. As discussed above, microservices can be used to develop an application having independently deployable services. However, in some cases, an application update may be challenging because an updated application to be deployed to customer sites may not work well with a particular data schema version used in the customer sites. For example, the updated application may not be backwards compatible with old databases.

The following example of a convenience store shows these problems. A convenience store, Q-mart, has stores in multiple geographic regions, such as New York and Chicago. The New York Q-mart's transaction system runs on the latest version of data schema while the Chicago Q-mart's transaction system runs on an older version of data schema. Both the latest and older versions of data schemas may work well with the current application for the transaction system. However, in some cases, an updated application may not work well with the older version of data schema while the updated application may work well with the latest version of data schema in the New York store. For example, there might be a new feature (e.g., price information) used in the updated application. If the older version of data schema does not have a field for the new feature (e.g., price information field) while the latest version of the data schema has such field, the updated application may not work well with the older version of data schema. As seen in the example above, in conventional systems, there may not be a practicable way to guarantee that an application update will work well with all versions of databases used in the client cites.

Aspects of the present disclosure may address the above noted deficiency by automated publishing of integration microservice and data container tuple. For example, a build server may monitor microservices used in an application (e.g., Q-mart's transaction system) to detect updates. For example, a microservice for an online payment may be updated from version 1 (not using age information) to version 2 (using age information). Once the build server detects the update to the microservice, the build server may update a liveness probe in the updated microservice using a production data schema that the updated microservice has used to check whether the updated microservice will work properly with the production data schema. As used herein, the production data schema may refer to data required by individual microservices. Examples of data in the data schema may include names, social security numbers, ages, list of products, and prices. In an example, the production data schema may have fields for such data (e.g., names and social security numbers) Once it is determined that the liveness probe test has passed, the build server may package the updated microservice with testing data to form a tuple in a service-dataplane container. The testing data is associated with the production data schema that the updated microservice has used. The testing data may be the same with the corresponding production data schema, for example, having the same fields for names and social security numbers, except that the names and social security numbers are not real (e.g., fake names and fake social security numbers).

In an example, the build server may detect an update to a data schema associated with a microservice. For example, a production data schema is updated from version 1 (without a price information field) to version 2 (with the price information field). Then, the build server may update a liveness probe in the microservice associated with the updated data schema against the updated data schema to check whether the updated data schema will work well with the microservice. Once it is determined that the liveness probe test has passed, the build server may package the microservice with testing data to form a tuple in a service-dataplane container.

In this way, each version of the microservices in the present disclosure may be independently and automatically verified with each version of the data schemas. That is, the microservices may be packaged with testing data (which is the same with or similar to production data schemas) which the microservices have been tested against. Then, it may be traced back which data schema version will or will not work properly with a given microservice version. Without these containers with tuples of microservices and testing data, it would be difficult to know whether the microservices would run properly with each implementing version of data schemas. This may also ensure that if a liveness probe test fails after an update to the microservice, the microservice can be rolled back to the version that is known to have worked properly with a given data schema. By automatically publishing/creating containers with tuples of microservices and data whenever there is an update to a microservice or data schema, the present disclosure provides automatically validated microservice release candidates for an updated application.

In an example, the build server may create a union database having a plurality of service dataplane containers created by the methods described above. Then, an application server may update an application liveness probe in an updated application against the plurality of service-dataplane containers. Once it is determined that that the application liveness probe test has passed, the application server may deploy the updated application. Since the updated application may be tested against all versions of data schemas available in the client cites, the present disclosure may be capable of providing a universal way to guarantee that an application update may be backward compatible against any version of data schemas. Also, this container based applications may advantageously allow old versions to coexist with new versions of both data as well as code.

FIG. 1 depicts a high-level component diagram of an example system 100 for different availability and performance requirements. The system 100 may include one or more client devices 110A-C. The system 100 may also include a data store 130. The data store 130 may include one or more Production Data_A schemas 132A-C and one or more Production Data_B schemas 134A-C. In an example, the Production Data_A schemas 132A-C may be used by Microservice_A and the Production Data_B schemas 134A-C may be used by Microservice_B.

The system 100 may include a build server 140. The build server 140 may include a union database 147. The union database 147 may include one or more service dataplane containers 150A-C. Each service dataplane container 150A-C may include one or more multi-dimensional tuples associated with a microservice and testing data. For example, it may be a tuple of (microservice, testing data). In an example, the tuple may not be limited to two-dimension, and the tuple can have more dimensions (e.g., three dimensions, four dimensions, etc.) including more information about the microservice or the testing data. In an example, each service dataplane container 150A-C may include information about two or more different types of microservices (e.g. Microservice_A 152 and Microservice_B 156) in the tuples. In another example, each service dataplane container 150A-C may include information about only one type of microservice (e.g. Microservice_A 152 or Microservice_B 156) in the tuple. Each service dataplane container 150A-C may also include testing data (e.g. Testing Data_A 154 and Testing Data_B 158) in the tuple, which is packaged with the microservices (e.g. Microservice_A 152 and Microservice_B 156). For example, one tuple may consist of Microservice_A 152 and Testing Data_A 154 and the other tuple may consist of Microservice_B 156 and Testing Data_B 158. In an example, the system 100 may include a monitor module 145 configured to monitor source code, microservices, and release tags. As used herein, the service dataplane container may refer to a collection of different microservices that may serve data to/from applications. In an example, a service dataplane container may consist of microservices hosting data served in redis, mysql, or mongodb from a unified REST API. In an example, there may be more than two types of microservices in the system 100. In an example, the system 100 may use a container based virtualization system such as Red Hat® OpenShift® or Docker® to create container images.

In an example, the system 100 may include an application server 160. The application server 160 may include an application 162. In an example, the application 162 may be a live application currently running in the client devices 110A-C. In an example, the application server 160 may include an updated application 164. In an example, the application 162 and/or the updated application 164 may include a liveness probe 165A-B. The liveness probe 165A-B may be configured to check whether applications are successfully running, and if not, automatically kills the applications. The application server 160 may also include an application deployer 166. The application deployer 166 may be configured to deploy applications (e.g. application 162 or updated application 164). In an example, the application server 160 may use Kubernetes® or Openshift®.

In an example, the one or more client devices 110A-C may communicate with the data store 130, the build server 140, and/or the application server 160 via a network 120. The network 120 may be a public network (e.g., the Internet), a private network (e.g., a local area network (LAN) or wide area network (WAN)), or a combination thereof.

The system 100 may also include one or more physical processors communicatively coupled to memory devices. As discussed herein, a memory device refers to a volatile or non-volatile memory device, such as RAM, ROM, EEPROM, or any other device capable of storing data. As used herein, physical processor or processor refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). Processors may be interconnected using a variety of techniques, ranging from a point-to-point processor interconnect, to a system area network, such as an Ethernet-based network. In an example, the one or more physical processors may be in the build server 140, application server, 160, or any other places in the system 100. In an example, all of the disclosed methods and procedures described herein can be implemented by the one or more processors.

Figure 2:
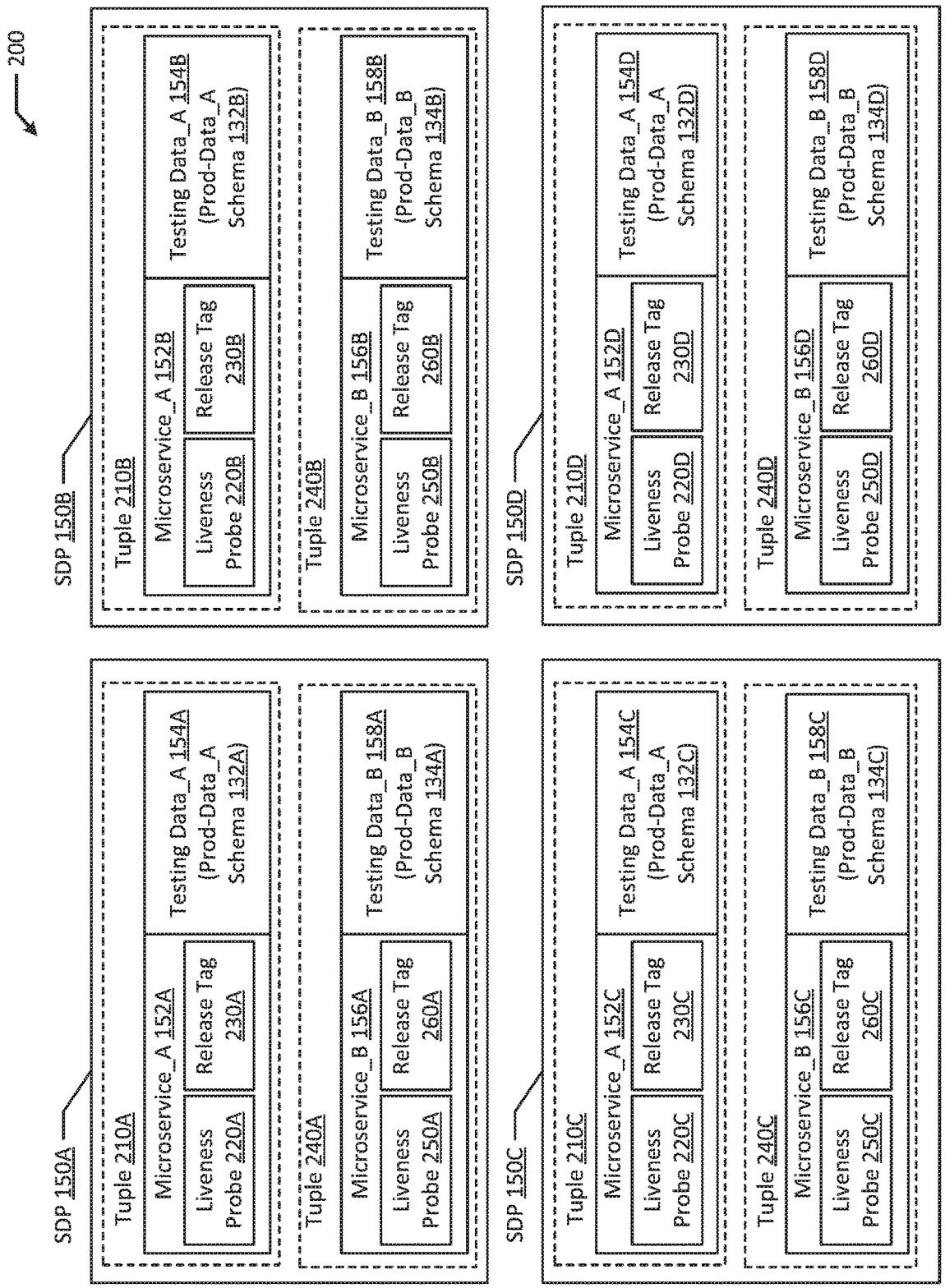
FIG. 2 a block diagram of a union database according to an example of the present disclosure.

FIG. 2 illustrates a block diagram of a union database 200 according to an example of the present disclosure. The union database 200 may include one or more service dataplane containers 150A-D. In an example, each of service dataplane containers 150A-D may include a tuple for each type of microservice. For example, if there are two types of microservices (e.g., Microservice_A and Microservice_B), there may be at least two tuples in each service dataplane container (e.g., a first tuple 210A for Microservice_A 152A and a second tuple 240A for Microservice_B 156A).

The first tuple 210 (i.e., tuples 210A-D) may include Testing Data_A 154 (i.e., Testing Data_A 154A-D). In an example, the Testing Data_A 154 may be associated with a production data schema used by the Microservice_A 152 (i.e., Microservice_A 152A-D). For example, Testing Data_A 154A is associated with Production Data_A Schema 132A, which is used by Microservice_A 152A. In an example, Microservice_A 152 may include a liveness probe 220 (i.e., liveness probe 220A-D). The liveness probe 220 may be configured to check whether the Microservice_A 152 will be running properly with the Testing Data_A 154 (and ultimately with Production Data_A Schemas 132A-D). In an example, Microservice_A 152 may include a release tag 230 (i.e., release tag 230A-D). The release tag 230 may indicate whether the Microservice_A 152 is updated. For example, the release tag 230 may include version numbers, such as v.1, v.2, and v.3.

The second tuple 240 (i.e., tuples 240A-D) may include Testing Data_B 158 (i.e., Testing Data_B 158A-D). In an example, the Testing Data_B 158 may be associated with a production data schema used by the Microservice_B 156 (i.e., Microservice_B 156A-D). For example, Testing Data_B 158A is associated with Production Data_B Schema 134A, which is used by Microservice_B 156A. In an example, Microservice_B 156 may include a liveness probe 250 (i.e., liveness probe 250A-D). The liveness probe 250 may be configured to check whether the Microservice_B 156 will be running properly with the Testing Data_B 158 (and ultimately with Production Data_B Schema 134A-D). In an example, Microservice_B 156 may include a release tag 260 (i.e., release tag 260A-D). The release tag 260 may indicate whether the Microservice_B 156 is updated. For example, the release tag 230 may include version numbers, such as v.1, v.2, and v.3.

In an example, the testing data (e.g., Testing Data_A 154A-D and Testing Data_B 158A-D) may be a snapshot of all data used by the microservices with which the testing data is packaged in the tuples. In an example, the testing data may have the production data schema used by the microservices. For example, Testing Data_A 154A may be Production Data_A Schema 132A used by Microservice_A 152A. As used herein, the production data schema may refer to data required by some individual microservices. Examples of data in the data schema may include names, social security numbers, ages, list of products, and prices. In an example, the data schema may have fields for such data (e.g., names and social security numbers). The data schema may be updated to add a new field (e.g., age). In an example, the testing data may be the same with the corresponding production data schema, for example, having the same fields for names and social security numbers, except that the names and social security numbers are not real (e.g., fake names and fake social security numbers). Each microservice (e.g., Microservice_A 152A-D, Microservice_B 156A-D) in the service dataplane containers 150A-D may represent each version of the microservices independently and automatically verified with each version of the data schemas. In each service dataplane container, the microservices may be packaged with testing data (which is the same with or similar to production data schemas) which the microservices have been tested against as described below.

Figure 3:
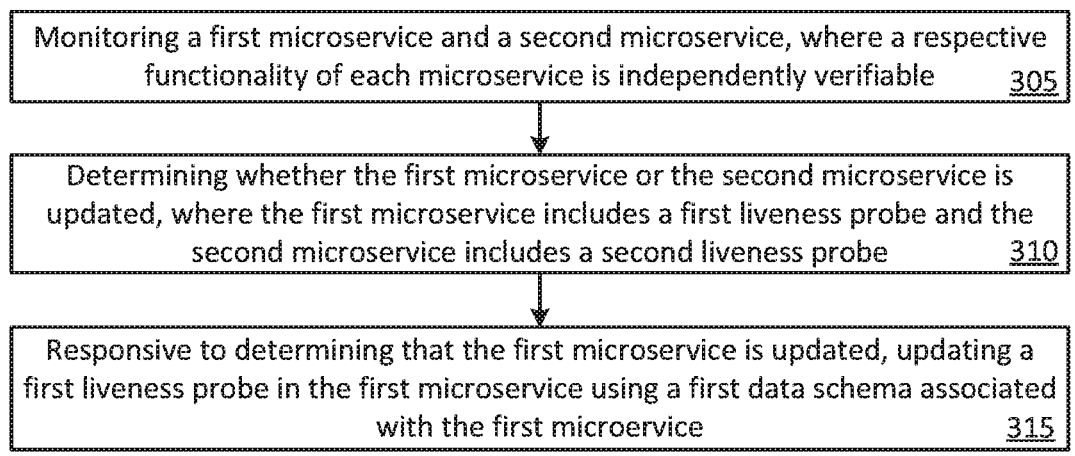
FIG. 3 is a flowchart illustrating an example method of operating a system for automatically validated release candidates for data-driven applications according to an example of the present disclosure.

FIG. 3 shows a flowchart of an example method of operating the system 100 according to an example of the present disclosure. Although the example method 300 is described with reference to the flowchart illustrated in FIG. 3, it will be appreciated that many other methods of performing the acts associated with the method may be used. For example, the order of some of the blocks may be changed, certain blocks may be combined with other blocks, and some of the blocks described are optional.

In the illustrated example, the example 300 begins with monitoring a first microservice and a second microservice, where a respective functionality of each microservice may be independently verifiable (block 305). For example, a monitor module 145 may monitor Microservice_A 152 and Microservice_B 156. The first and second microservices may be components of an application with a single function or service, such as making an online payment or routing network traffic. Then, the monitor module may determine whether at least one of the first microservice and the second microservice is updated, where the first microservice may include a first liveness probe and the second microservice may include a second liveness probe (block 310). For example, the monitor module 145 may determine whether at least one of Microservice_A 152 and Microservice_B 156 is updated. Microservice_A 152 may include a Liveness Probe 220A and Microservice_B 156 may include Liveness Probe 250A. In an example, the monitor module may determine that the first microservice is updated. For example, a microservice for an online payment may be updated from version 1 (not using age information) to version 2 (using age information). Then, responsive to determining that the first microservice is updated, a build server may update the first liveness probe using/against a first data schema associated with the first microservice (block 315). For example, responsive to determining that Microservice_A 152 is updated, the build server 140 may update Liveness Probe 220A against Production Data_A Schema 132A. As used herein, updating a liveness probe of a microservice against a data schema refers to updating a liveness probe of a microservice using a data schema to check whether the microservice will work properly with the data schema. The first data schema (e.g., Production Data_A Schema 132A) may be associated with the first microservice (e.g., Microservice_A 152). For example, the first microservice (e.g., Microservice_A 152) may use the first data schema (e.g., Production Data_A Schema 132A) when the first microservice is running.

Figure 4A:
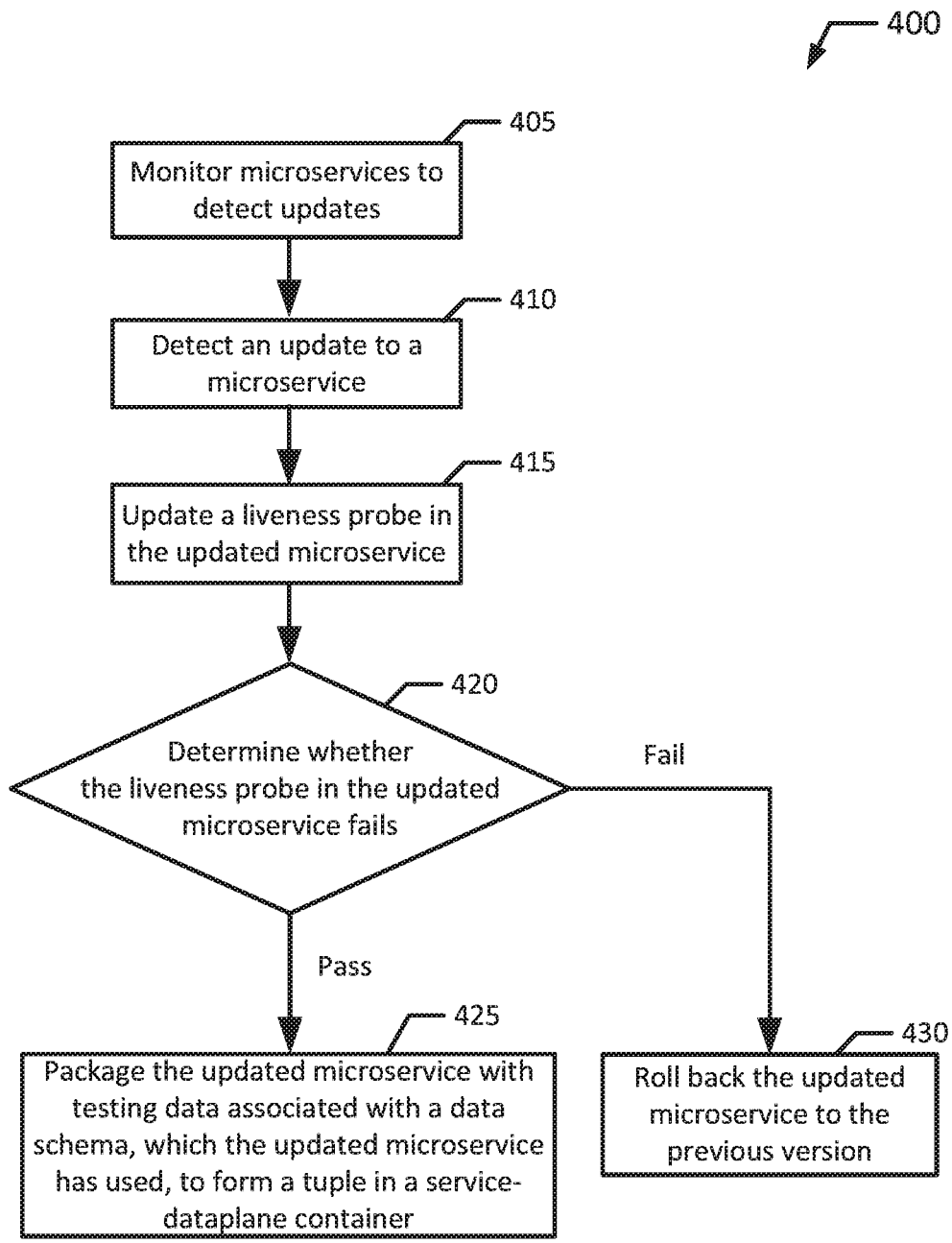
FIGS. 4A, 4B, and 4C are flowcharts illustrating example methods of operating a system for automatically validated release candidates for data-driven applications according to an example of the present disclosure.

FIG. 4A shows a flowchart of an example method 400 for a system for automatically validated release candidates for data-driven applications according to an example of the present disclosure. Although the example method 400 is described with reference to the flowchart illustrated in FIG. 4A, it will be appreciated that many other methods of performing the acts associated with the method may be used. For example, the order of some of the blocks may be changed, certain blocks may be combined with other blocks, and some of the blocks described are optional.

In the illustrated example, a monitor module may monitor microservices to detect updates (block 405). For example, the monitor module 145 may monitor Microservice_A 152 and Microservice_B 156 to detect updates of Microservice_A 152 and Microservice_B 156. In an example, the monitor module 145 may monitor the first microservice and the second microservice by monitoring a first release tag (e.g. Release Tag 230A) of the first microservice and a second release tag (e.g. Release Tag 260A) of the second microservice. Then, the monitor module may detect an update to a microservice (block 410). For example, the monitor module 145 may detect that Microservice_A 152 is updated. Then, a build server may update a liveness probe in the updated microservice (block 415). For example, the build server 140 may update Liveness Probe 220A in Microservice_A 152. In an example, the build server may update the liveness probe in the updated microservice against a production data schema the updated microservice has used before the update to check whether the updated microservice would also work properly with that production data schema. Then, the build server may determine whether the liveness probe in the update microservice fails (block 420). For example, the build server 140 may determine whether the Liveness Probe 220A in the Microservice_A 152 fails.

Responsive to determining that the liveness probe in the update microservice has passed (e.g., not failed), the build server may package the updated microservice with testing data associated with a data schema, which the updated microservice has used before the update, to form a tuple in a service-dataplane container (block 425). For example, if passed, the build server 140 may package the Microservice_A 152A with the Testing Data_A 154A associated with the Production Data_A Schema 132A, which the Microservice_A 152A has used before the update, to form a tuple 210A in a service-dataplane container 150A. If it is determined that the liveness probe has failed, the build server may roll back the updated microservice to the previous version (block 430).

Referring back to FIG. 2, Microservice_A 152 (i.e., any of Microservice_A 152A-D) may be the same or different version of Microservice_A. For example, Microservice_A_v.1 may be an initial version of Microservice_A. If Microservice_A_v.1 is updated, it may become Microservice_A_v.2. Similarly, Microservice_B 156 (i.e., any of Microservice_B 156A-D) may be the same or different version of Microservice_B. For example, Microservice_B_v.1 may be an initial version of Microservice_B. If Microservice_B_v.1 is updated, it may become Microservice_B_v.1. In an example, Production Data_A Schema 132 (i.e., any of Production Data_A Schema 132A-D) may be the same or different version of Production Data_A Schema. For example, Production Data_A Schema_v.1 may be an initial version of Production Data_A Schema. If Production Data_A Schema_v.1 is updated, it may become Production Data_A Schema_v.2. Similarly, Production Data_B Schema 134 (i.e., any of Production Data_B Schema 134A-D) may be the same or different version of Production Data_B Schema. For example, Production Data_B Schema_v.1 may be an initial version of Production Data_B Schema. If Production Data_B Schema_v.1 is updated, it may become Production Data_B Schema_v.2.

In an example, Microservice_A 152A is Microservice_A_v.1 and Microservice_B 156A is Microservice_B_v.1. A build server may create a first service dataplane container 150A with Microservice_A_v.1 and Microservice_B_v.1. For example, the build server may create the first service dataplane container 150A when it is confirmed that Microservice_A_v.1 is running properly with Production Data_A_v.1 (e.g., Production Data_A Schema 132A) and Microservice_B_v.1 is running properly with Production Data_B_v.1 (e.g., Production Data_B Schema 134A). In this case, the first service dataplane container 150A may include a tuple 210A of Microservice_A_v.1 and Testing Data_A 154A. The Testing Data_A 154A may be similar to Production Data_A Schema_v.1. The first service dataplane container 150A may also include a tuple 240A of Microservice_B_v.1 and Testing Data_B 158A. The Testing Data_B 158A may be similar to Production Data_B Schema_v.1.

If Microservice_A 152A and Microservice_B 156A can be updated once, there may be at least four different combinations. For example, Microservice_A 152A and Microservice_B 156A may be Microservice_A_v.1 and Microservice_B_v.1. Microservice_A 152B and Microservice_B 156B may be Microservice_A_v.2 and Microservice_B_v.1. Microservice_A 152C and Microservice_B 156C may be Microservice_A_v.1 and Microservice_B_v.2. Microservice_A 152D and Microservice_B 156D may be Microservice_A_v.2 and Microservice_B_v.2.

Assuming that there were no updates to the microservices since an initial application (e.g., application_v1) was deployed, there may be only one service dataplane container 150A with Microservice_A_v.1 (e.g., Microservice_A 152A) and Microservice_B_v.1 (e.g., Microservice_B 156A). If the monitoring module 145 detects that the Microservice_A is updated from Microservice_A_v.1 (e.g., Microservice_A 152A) to Microservice_A_v.2 (e.g., Microservice_A 152B), the build server 140 may update the liveness probe (e.g. Liveness Probe 220B) in Microservice_A_v.2 using the Production Data_A Schema_v.1 (e.g., Production Data_A Schema 132A) as described above. If the liveness probe has passed the update, the build server 140 may package the Microservice_A_v.2 (e.g., Microservice_A 152B) with testing data (e.g. Testing Data_A 154B) to form a tuple 210B and put the tuple 210B in a second service dataplane container 150B. Testing Data_A 154B may be similar to the Production Data_A Schema_v.1. In an example, although Microservice_B was not updated, the build server 140 may also package the Microservice_B_v.1 with testing data (e.g. Testing Data_B 158B) to form a tuple 240B and put the tuple 240B in the second service dataplane container 150B. The Testing Data_B 158B may be similar to the Production Data_B Schema_v.1. In an example, the build server 140 may simply copy the tuple 240A to the tuple 240B. In an example, the second service dataplane container 150B may only have the tuple 210B without the tuple 240B.

If it is detected that only the Microservice_B is updated from Microservice_B_v.1 (e.g., Microservice_B 156A) to Microservice_B_v.2 (e.g., Microservice_B 156C), it may update the liveness probe (e.g. Liveness Probe 250C) in Microservice_B_v.2 against the Production Data_B Schema_v.1 (e.g., Production Data_B Schema 134A) as described above. If the liveness probe has passed the update, the build server 140 may package the Microservice_B_v.2 (e.g., Microservice_B 156C) with testing data (e.g. Testing Data_B 158C) to form a tuple 240C and put the tuple 240C in a third service dataplane container 150C. Testing Data_B 158C may be similar to the Production Data_B Schema_v.1. In an example, although the Microservice_A was not updated, the build server 140 may also package the Microservice_A_v.1 with testing data (e.g. Testing Data_A 154C) to form a tuple 210C and put the tuple 210C in the third service dataplane container 150C. The Testing Data_A 154C may be similar to the Production Data_A Schema_v.1. In an example, the build server 140 may simply copy the tuple 210A to the tuple 210C. In an example, the third service dataplane container 150C may only have the tuple 240C without the tuple 210C.

If it is detected that both the Microservice_A and the Microservice_B are updated, it may update the liveness probes (e.g. Liveness Probes 220D and 250D) in Microservice_A_v.2 (e.g., Microservice_A 152D) and Microservice_B_v.2 (e.g., Microservice_B 156D) against the Production Data_A Schema_v.1 and the Production Data_B Schema_v.1, respectively. If the Liveness Probes 220D has passed the update, the build server 140 may package the Microservice_A_v.2 (e.g., Microservice_A 152D) with testing data (e.g. Testing Data_A 154D) to form a tuple 210D and put the tuple 210D in a fourth service dataplane container 150D. If the Liveness Probes 250D has passed the update, the build server 140 may also package the Microservice_B_v.2 (e.g., Microservice_B 156D) with testing data (e.g. Testing Data_B 158D) to form a tuple 240D and put the tuple 240D in the fourth service dataplane container 150D.

Figure 4B:
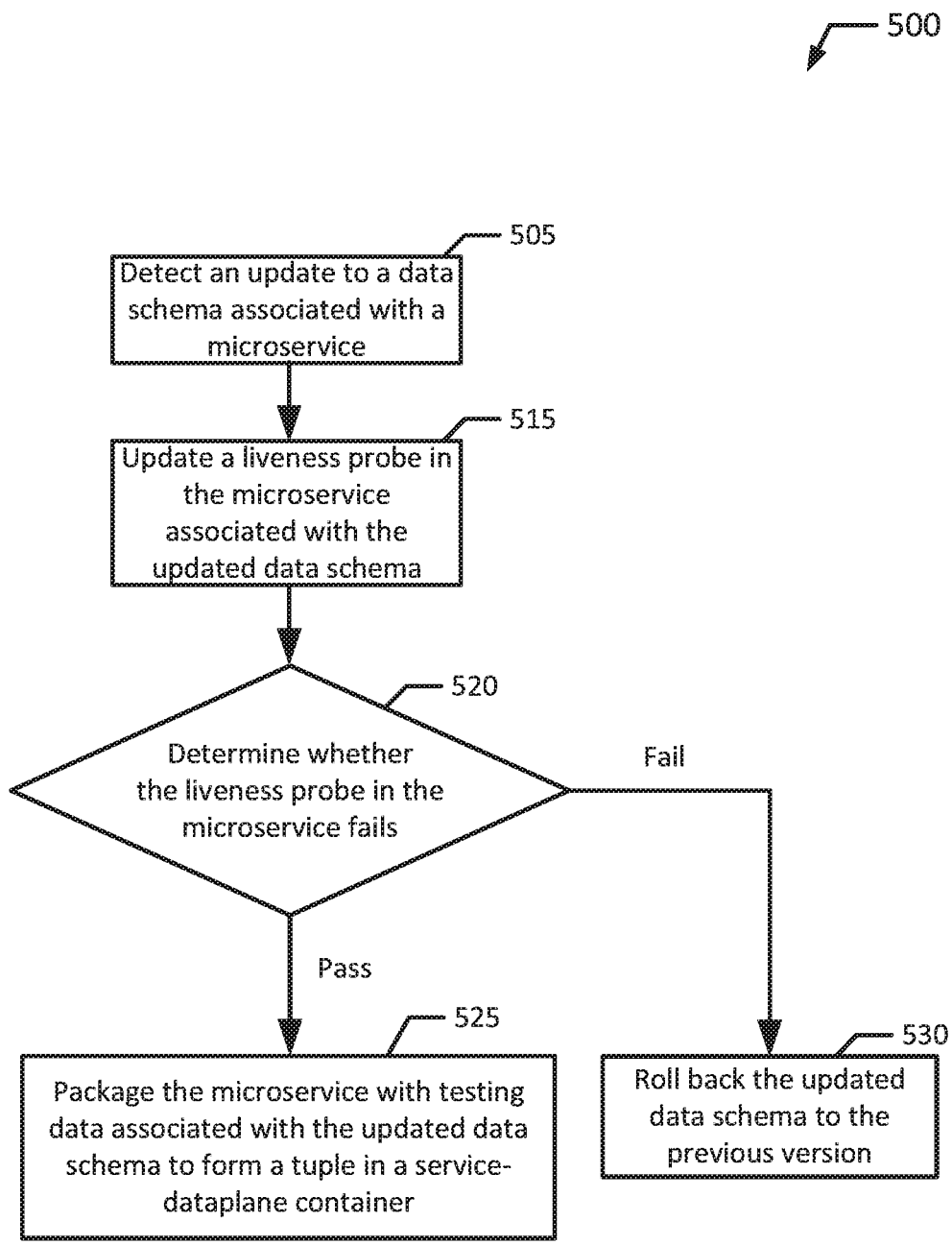

FIG. 4B shows a flowchart of an example method 500 for a system for automatically validated release candidates for data-driven applications according to an example of the present disclosure. Although the example method 500 is described with reference to the flowchart illustrated in FIG. 4B, it will be appreciated that many other methods of performing the acts associated with the method may be used. For example, the order of some of the blocks may be changed, certain blocks may be combined with other blocks, and some of the blocks described are optional.

In the illustrated example, a monitor module may detect an update to a data schema associated with a microservice (block 505). For example, a monitor module 145 may detect an update to Production Data_A Schema_v1 (e.g. Production Data_A Schema 132A), which is associated with Microservice_A_v1 (e.g., Microservice_A 152A). The Production Data_A Schema 132A may be updated from Production Data_A Schema_v.1 (e.g. Production Data_A Schema 132A) to Production Data_A Schema_v.2 (e.g. Production Data_A Schema 132B). Then, a build server may update a liveness probe in the microservice associated with the updated data schema against the updated data schema (block 515). For example, a build server 140 may update the Liveness Probe 220A in the Microservice_A_v1 (e.g., Microservice_A 152A) against the Production Data_A Schema_v.2 (e.g. Production Data_A Schema 132B).

Then, the build server may determine whether the liveness probe in the microservice fails (block 520). Responsive to determining that the liveness probe has passed, the build server may package the microservice with testing data to form a tuple in a service-dataplane container (block 525). For example, if passed, the build server 140 may package Microservice_A_v1 (Microservice_A 152A) with Testing Data_A 154B to form a tuple 210B in a service-dataplane container 150B. (In this case, Microservice_A 152A may become Microservice_A 152B.) In an example, the testing data (e.g., Testing Data_A 154B) may be associated with the updated production data schema (e.g., Production Data A Schema 132B). If it is determined that the liveness probe has failed, the build server may roll back the updated data schema to the previous version (block 530). For example, if failed, the build server 140 may roll back the Production Data_A Schema_v.2 to the Production Data_A Schema_v.1.

Figure 4C:
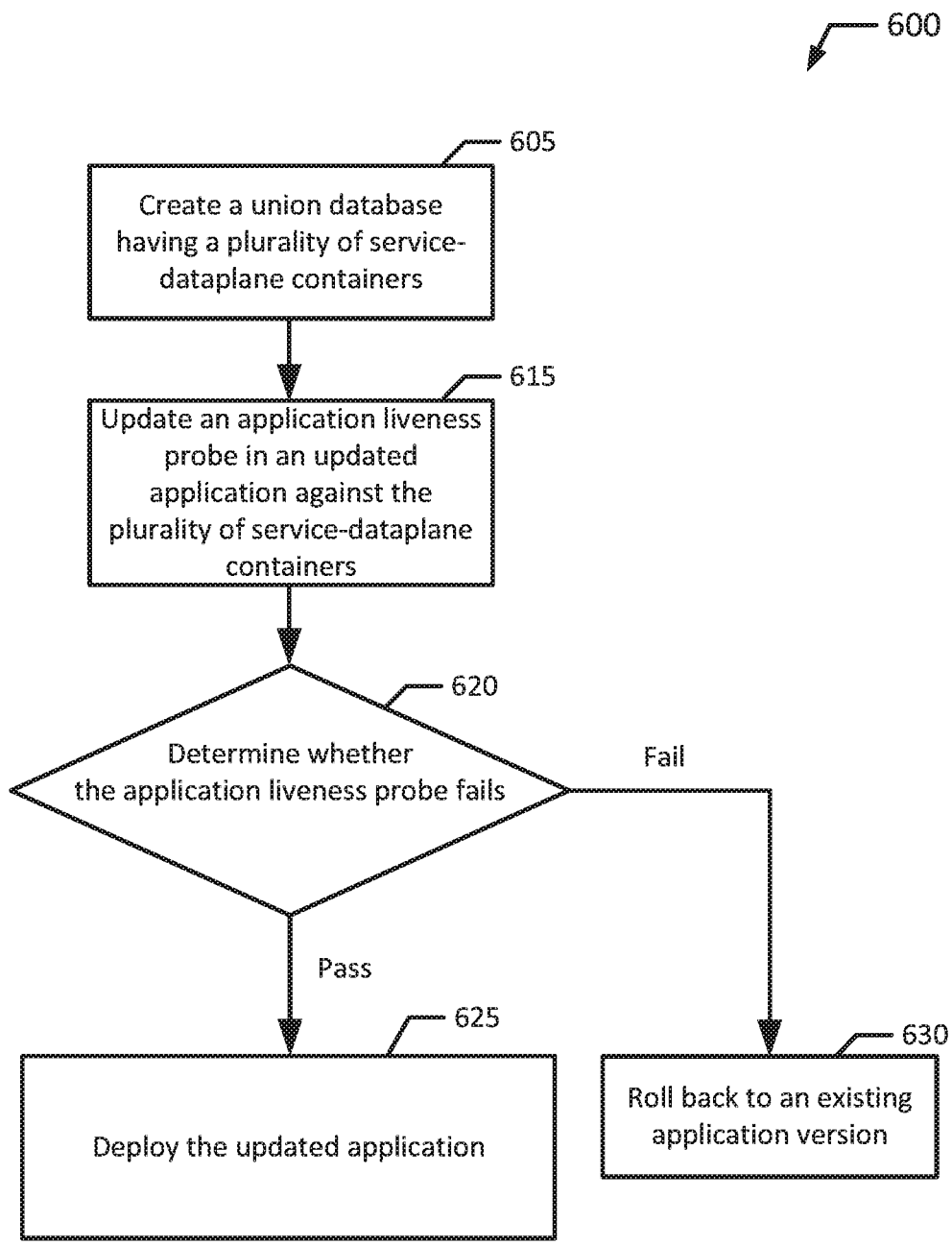

FIG. 4C shows a flowchart of an example method 600 for a system for automatically validated release candidates for data-driven applications according to an example of the present disclosure. Although the example method 600 is described with reference to the flowchart illustrated in FIG. 4C, it will be appreciated that many other methods of performing the acts associated with the method may be used. For example, the order of some of the blocks may be changed, certain blocks may be combined with other blocks, and some of the blocks described are optional.

In the illustrated example, a build server may create a union database having a plurality of service dataplane containers (block 605). For example, a build server 140 may create a union database 147 having a plurality of service dataplane containers 150A-D. In an example, the service dataplane containers 150A-D may be created by the methods described above in connection with FIGS. 2, 4A, and/or 4B. Then, an application server may update an application liveness probe in an updated application against the plurality of service-dataplane containers to check whether the updated application may work properly with all versions of data schemas (block 615). For example, an application server 160 may update the Liveness Probe 165B in the Updated Application 164 against the plurality of service-dataplane containers 150A-D. In an example, the application server may update the application liveness probe against only some critical service-dataplane containers. In an example, critical service-dataplane containers may refer to service dataplane containers having most recent version of microservices or testing data associated with production data schema versions currently used in client sites. In another example, the application server may update the application liveness probe against all service dataplane containers in the union database.

Then, the application server may determine whether the application liveness probe fails (block 620). For example, the application server 160 may determine whether the Liveness Probe 165B fails. Responsive to determining that the first liveness probe has passed, the application server may deploy the updated application (block 625). For example, if passed, the application server 160 may deploy the Updated Application 164 to the client devices 110A-C. Responsive to determining that the first liveness probe has failed, the application server may roll back to an existing application version (block 630). For example, if failed, the application server 160 may roll back to the Application 162.

Figure 5:
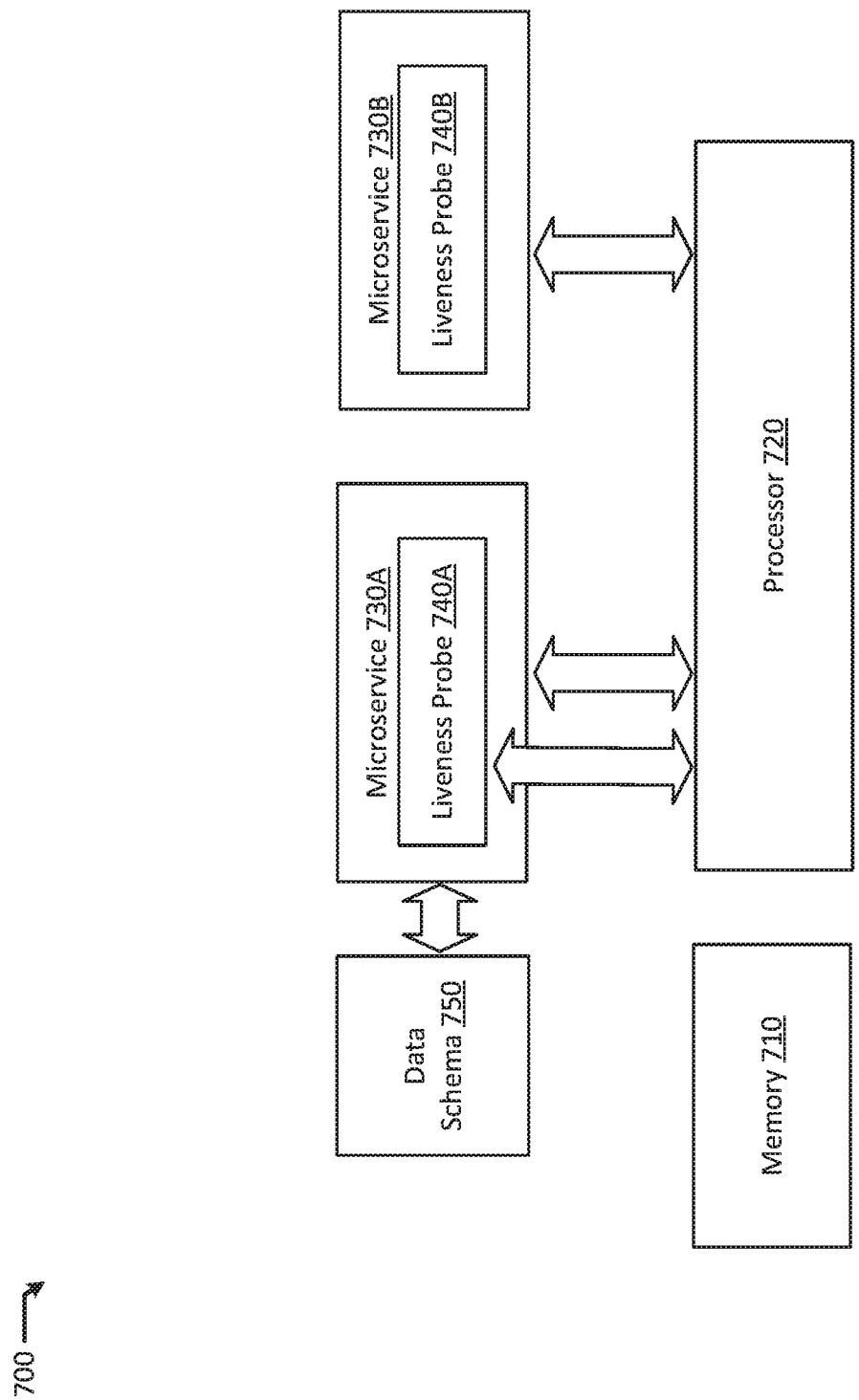
FIG. 5 is a block diagram of an example system according to an example of the present disclosure.

FIG. 5 is a block diagram of an example system according to an example of the present disclosure. As illustrated in FIG. 5, an example system 700 may include a memory 710 and one or more processors 720 in communication with the memory 710. The one or more processors 720 may be configured, when executed, to monitor a first microservice 730A and a second microservice 730B. A respective functionality of each microservice 730A-B is independently verifiable. The one or more processors 720 may also be configured, when executed, to determine whether at least one of the first microservice 730A and the second microservice 730B is updated. The first microservice 730A may include a first liveness probe 740A and the second microservice 730B may include a second liveness probe 740B. The one or more processors 720 may be configured, when executed, to update the first liveness probe 740A using a first data schema 750 responsive to determining that the first microservice 730A is updated. The first data schema 750 may be associated with the first microservice 730A.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

The examples may be embodied in the form of computer-implemented processes and apparatuses for practicing those processes. An example may also be embodied in the form of a computer program code containing instructions embodied in tangible media, such as floppy diskettes, CD-ROMs, DVD-ROMs, hard drives, or any other computer readable non-transitory storage medium, wherein, when the computer program code is loaded into and executed by a computer, the computer becomes an apparatus for carrying out the method. An example may also be embodied in the form of computer program code, for example, whether stored in a storage medium, loaded into and/or executed by a computer, or transmitted over some transmission medium, such as over electrical wiring or cabling, through fiber optics, or via electromagnetic radiation, where when the computer program code is loaded into and executed by a computer, the computer becomes an apparatus for carrying out the method. When implemented on a general-purpose microprocessor, the computer program code segments configure the microprocessor to create specific logic circuits.

It should be understood that various changes and modifications to the examples described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method comprising:
   detecting an update to a first data schema associated with a first microservice among a plurality of microservices, wherein a respective functionality of each of the plurality of microservices is independently verifiable, wherein each of the plurality of microservices includes a liveness probe; and
   responsive to detecting that the first data schema is updated, updating a first liveness probe of the first microservice using the updated first data schema.

2. The method of claim 1, further comprising determining whether the first liveness probe passes or fails.

3. The method of claim 2, further comprising responsive to determining that the first liveness probe has failed, rolling back the first data schema.

4. The method of claim 2, further comprising responsive to determining that the first liveness probe has passed, packaging the first microservice with first testing data to form a first tuple of a first service-dataplane container, wherein the first testing data is associated with the first data schema.

5. The method of claim 4, wherein the first data schema includes fields for data, wherein the first testing data includes same fields as the fields of the first data schema.

6. The method of claim 4, wherein the first testing data is a snapshot of data used by the first microservice.

7. The method of claim 4, further comprising:
   determining whether at least one of the plurality of microservices is updated; and
   responsive to determining that a second microservice among the plurality of microservices is updated, updating a second liveness probe of the second microservice using a second data schema, wherein the second data schema is associated with the second microservice.

8. The method of claim 7, further comprising:
   determining whether the second liveness probe passes; and
   responsive to determining that the second liveness probe has passed, packaging the second microservice with second testing data to form a second tuple of a second service-dataplane container, wherein the second testing data is associated with the second data schema.

9. The method of claim 8, further comprising creating a union database, wherein the union database includes the first service-dataplane container and the second service-dataplane container.

10. The method of claim 9, further comprising:
    updating an application liveness probe in an updated application using the first service-dataplane container and the second service-dataplane container;
    determining whether the application liveness probe passes or fails;
    responsive to determining that the application liveness probe has failed, rolling back to an existing application version; and
    responsive to determining that the application liveness probe has passed, deploying the updated application.

11. The method of claim 1, wherein the update to the first data schema comprises an addition of a new field.

12. A system comprising:
    a memory; and
    one or more processors in communication with the memory;
    wherein the one or more processors, when executed:
    detect an update to a first data schema associated with a first microservice among a plurality of microservices, wherein a respective functionality of each of the plurality of microservices is independently verifiable, wherein each of the plurality of microservices includes a liveness probe; and responsive to detecting that the first data schema is updated, update a first liveness probe of the first microservice using the updated first data schema.

13. The system of claim 12, wherein the one or more processors determine whether the first liveness probe passes or fails.

14. The system of claim 13, wherein responsive to determining that the first liveness probe has failed, the one or more processors roll back the first data schema.

15. The system of claim 13, wherein responsive to determining that the first liveness probe has passed, the one or more processors package the first microservice with first testing data to form a first tuple of a first service-dataplane container, wherein the first testing data is associated with the first data schema.

16. The system of claim 15, wherein the first data schema includes fields for data, wherein the first testing data includes same fields as the fields of the first data schema.

17. The system of claim 15, wherein the first testing data is a snapshot of data used by the first microservice.

18. The system of claim 15, wherein the one or more processors:

determine whether at least one of the plurality of microservices is updated; and responsive to determining that a second microservice among the plurality of microservices is updated, update a second liveness probe of the second microservice using a second data schema, wherein the second data schema is associated with the second microservice.

19. The system of claim 18, wherein the one or more processors:

determine whether the second liveness probe passes; and responsive to determining that the second liveness probe has passed, package the second microservice with second testing data to form a second tuple of a second service-dataplane container, wherein the second testing data is associated with the second data schema.

20. A non-transitory machine readable medium storing instructions, which when executed by one or more processors in a computer system, cause the computer system to perform a method comprising:

detecting an update to a first data schema associated with a first microservice among a plurality of microservices, wherein a respective functionality of each of the plurality of microservices is independently verifiable, wherein each of the plurality of microservices includes a liveness probe; and responsive to detecting that the first data schema is updated, updating a first liveness probe of the first microservice using the updated first data schema.

* * * * *